Aug. 12, 1930. D. E. LEWELLEN ET AL Re. 17,767

CONTROLLER

Original Filed May 13, 1925 2 Sheets-Sheet 1

Inventors

By Darcy E. Lewellen
Emmors F. Lewellen

Attorney

CONTROLLER

Original Filed May 13, 1925 2 Sheets-Sheet 2

Inventors
Darcy E. Lewellen
Emmons F. Lewellen
By
Attorney

Reissued Aug. 12, 1930

Re. 17,767

UNITED STATES PATENT OFFICE

DARCY E. LEWELLEN AND EMMONS F. LEWELLEN, OF COLUMBUS, INDIANA

CONTROLLER

Original No. 1,643,716, dated September 27, 1927, Serial No. 30,113, filed May 13, 1925. Application for reissue filed April 5, 1929. Serial No. 352,870.

This invention relates to controllers, and is designed primarily for use in connection with paper making machines although it may be used for various other purposes.

The prime feature of the invention, in connection with a selective mechanism for governing the movement of the stock gate for controlling the admission of pulp to the machine, is means for intermittently imparting impulses to a motor or other device for operating the stock gate.

A further feature of the invention is the provision of means for regulating the time and duration of the impulses.

A further feature of the invention is the provision of means for accurately denoting the duration of the impulses imparted to the motor.

A further feature of the invention is the provision of means for manually regulating the impulse controlling mechanism whereby impulses of varying duration may be obtained and the intervals between the impulses determined, and A further feature of the invention is the provision of means for automatically stopping and controlling the operation of the motor employed for controlling the stock gate.

Other objects and advantages will be hereinafter more fully set forth and pointed out in the accompanying specification.

In the accompanying drawings which are made a part of this application,

Figure 1:
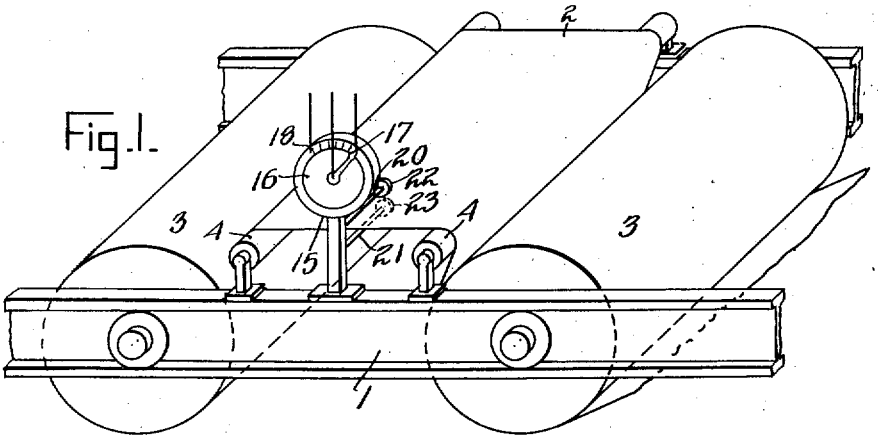
Figure 1 is a detail perspective view of a paper making machine showing means associated therewith for detecting the variance in the thickness in the sheet of paper as it is formed.
Figure 2:
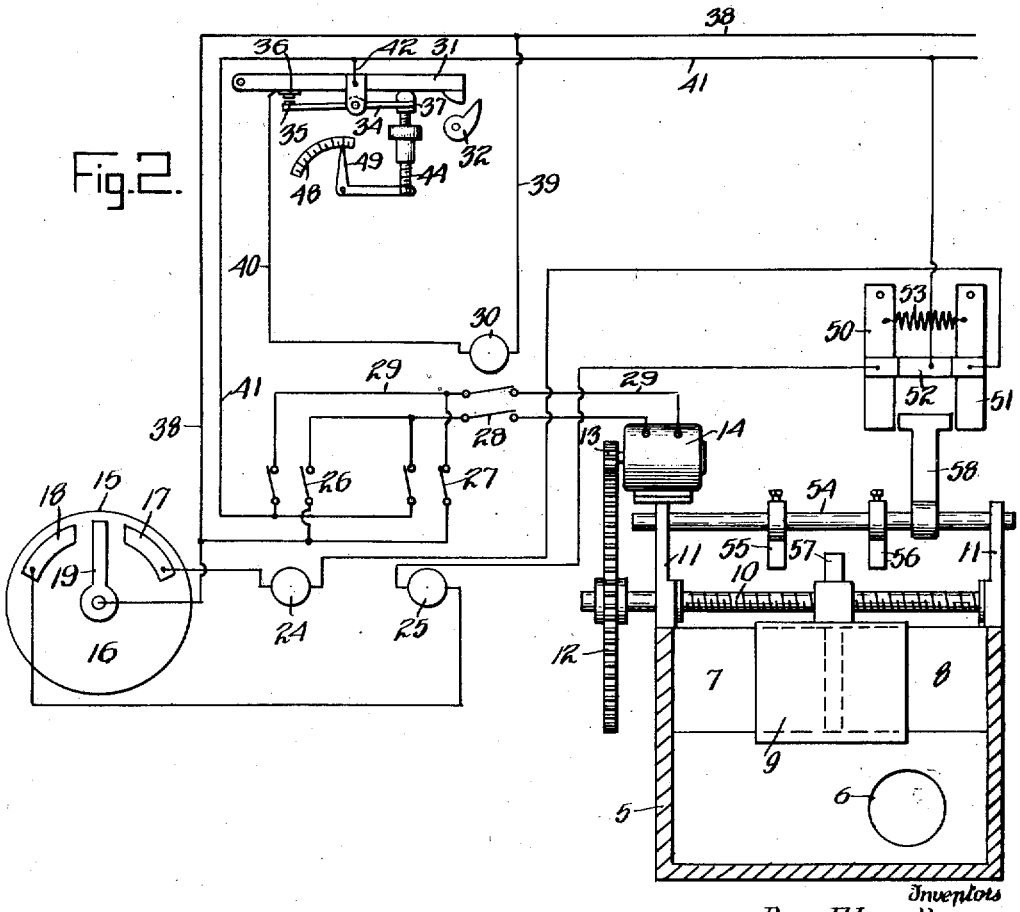
Figure 2 is a sectional view through the stock box of the machine showing the controlling means therefor in diagram.
Figure 3:
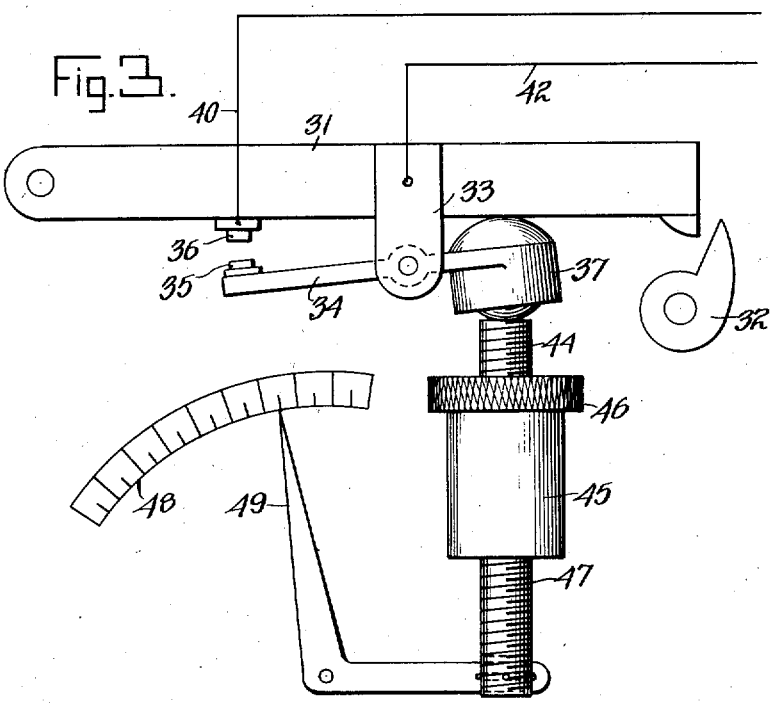
Figure 3 is an elevation of the impulse imparting and controlling mechanism.
Figure 5:
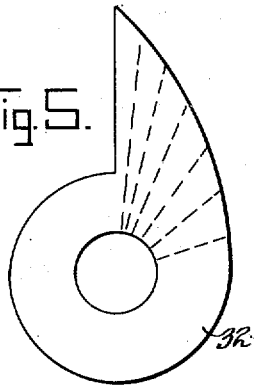
Figure 5 is an elevation of one form of cam used in connection with the impulse controlling mechanism.
Figure 4:
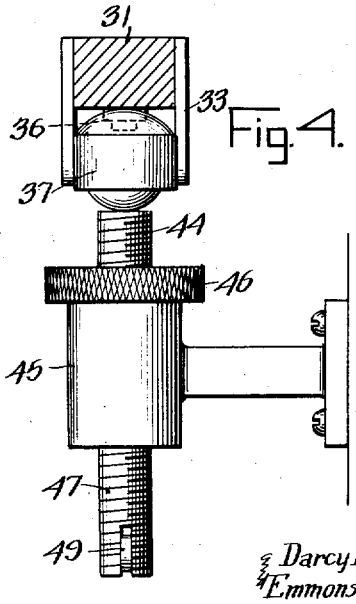
Figure 4 is an end elevation thereof partly in section.

Referring to the drawings in which similar reference numerals designate corresponding parts throughout the several views, 1 indicates the frame of any suitable form of paper making machine and 2 indicates a sheet of paper which passes lengthwise through the machine and around rollers 3 and 4, these parts being of the usual type in machines of this class.

In paper making machines the stock or pulp is first introduced into a stock box 5, through an opening 6 and is then fed from said box through a passageway 7, to the rolls of the machine or returned through a passageway 8 to the pulp vat or container.

To control the feed of the stock to the machine or through the passage way 7, a stock gate or valve 9 is mounted in the box 5 and positioned to move back and forth over the open ends of the passage ways 7 and 8, the stock gate being threaded on to a shaft 10, rotatably mounted in standards 11 at the upper end of the box 5.

The gate or valve 9 is moved back and forth over the openings to the passage ways 7 and 8 by attaching a gear 12 to one end of the shaft 10 with which meshes a cog 13 of an electric motor 14, which when energized, will rotate the shaft 10 and cause the gate to travel lengthwise of the shaft and over the end of the passage way 7 to retard the flow of stock into said passage way and cause the greater portion thereof to return through passage way 8, or over the open end of the passage way 8 to cause a greater supply of the stock to enter the passage way 7, depending upon the variance of the thickness of the sheet of paper as it reaches a prescribed point in the machine.

Heretofore considerable difficulty has been encountered in maintaining a substantially uniform thickness of the paper, as this operation has been performed mainly by hand, but in the present instance automatic calipering means is provided for detecting the variance in thickness of the paper as it is made into sheets, comprising a testing gage 15 of any conventional construction, but preferably having a dial 16 on which are contact points 17 and 18 adjacent its edge with which cooperates a hand 19 for completing circuits when moved into engagement with either of the contacts 17 or 18.

Cooperating with the hand 19 and adapted to move the hand back and forth over the face of the dial 16, is a pair of shafts 20 and 21, on the free ends of which are mounted disks 22 and 23, respectively, the disk 22 passing above the sheet of paper 2 and the disk 23 below the sheet, one of said disks normally traveling against one face of the sheet of paper while the other disk is held yieldingly in constant contact with the opposite face of the paper in any preferred manner. In this instance the calipering mechanism is used for energizing magnets 24 and 25 and said magnets are in turn used for closing and opening electric switches 26 and 27, the circuits formed by closing said switches determining the direction of rotation of the motor 14. With this structure, when the stock of the paper becomes thinned beyond the prescribed weight, the movable disk will move towards the stationary disk and move the hand 19 into engagement with one of the contacts on the dial 16 and energize one of the magnets for closing one of the switches 26 or 27 and vice versa, when the thickness of the paper stock becomes too great.

In order to impart periodical impulses to the motor 14 and cause the same to rotate in the direction determined by the closing of one or the other of the switches 26 or 27, a switch 28 is located in the circuit 29 extending from the switches 26 and 27 to the motor 14 and between the switches 26 and 27 and the motor so that even though one or the other of these switches is closed, the motor will not be energized until the switch 28 is closed.

The switch 28 is opened and closed by means of a magnet 30, which is controlled and intermittently energized through the medium of a timing device comprising a bar 31, one end of which is pivoted, while the opposite end thereof is adapted to be contacted by a revolving cam 32 for elevating the free end of the bar. Extending downwardly from the bar 31 is a pair of ears 33, between which is pivoted a rocker arm 34, said arm having a contact point 35 at one end adapted to engage a contact point 36 on the bar 31, while the opposite end thereof is provided with a weight 37, which weight, when the bar 31 is swung to a certain position, will cause the contact 35 to move into and remain in engagement with the contact 36. One pole of the magnet 30 is connected with one of the main line wires 38 through a wire 39, while the opposite pole of said magnet is connected with contact point 36 through a wire 40. The contact point 35 is connected with the other main line wire 41 through a wire 42, consequently, when contact points 35 and 36 are brought together, a circuit will be formed through the magnet 30 and said magnet energized for closing the switch 28.

The switch 28 is intermittently opened and closed for imparting successive impulses to the motor 14 through the medium of the cam 32, which is rotated from any suitable source, said cam being so constructed that, when rotated to a certain position, the bar 31 will be raised a sufficient distance to permit the contact 35 to move into engagement with the contact 36. When the cam 32 releases from the bar 31, said bar will drop downwardly until the weighted end 37 of the rocker arm 34 engages a supporting pin 44, the continued downward movement of the bar 31 causing the contact 35 to move out of engagement with the contact 36. The cam 32 is or may be so constructed that the bar 31 may be more or less rapidly elevated and is further so constructed as to obtain a substantially instant separation between the contacts 35 and 36 when the bar is released from the cam, thereby obtaining an instant snappy break in the circuit.

The pin 44 is vertically slidable through a stationary sleeve 45 and is vertically adjustable by means of a nut 46, which rests upon the sleeve 45 and engages threads 47 on the pin 44, consequently, by rotating the nut 46, the pin 44 may be raised or lowered, for accurately determining the instant of engagement of the contacts 35 and 36, the higher the pin 44 is adjusted the shorter the duration of the contact between the elements 35 and 36.

The duration of the impulses is accurately determined by providing any suitable form of scale 48, with which cooperates a pivotally mounted indicator finger 49, one arm of the finger being pivotally connected with the lower end of the pin 44, so that, when said pin is adjusted vertically, the finger 49 will show accurately the length or duration of the impulse, in other words, the amount of time the contact points 35 and 36 will remain in engagement with each other while the cam 32 is in engagement with the bar 31.

In paper making machines the stock controlling valve or gate is necessarily located some distance from the point where the sheet of paper is first actually formed, such distance varying in different sizes and types of machines. It is also necessary to locate the gauging or calipering device at a point where the paper is sufficiently formed to determine the proper thickness thereof.

In automatically controlling the thickness of the paper, it is necessary that the change in the amount of stock being fed to the machine be made intermittently and an interval of time be allowed to elapse before another change is made and this interval must be sufficient to allow the change in the thickness to reach the point where the gauging device operates.

With this in view the above described mechanism is employed for imparting one or a series of impulses to the gate operating mechanism, the duration of such impulse or impulses being adjusted to suit the conditions of the stock being used. After each impulse the stock gate remains in a stationary position for a longer or shorter period of time as is determined by the adjustment of the controller and such period of time is always sufficient to permit the change in paper thickness to act upon the gauging device.

If the change in the position of the stock gate is not sufficient to make the paper the proper thickness, another impulse will be imparted to the gate operating mechanism and the cycle of operation repeated, when the cam 32 again engages and elevates the end of the bar 31.

If the change in thickness is too great, the gauging device will move in the opposite direction and in that event the direction selecting means will cause the gate operating mechanism to rotate in the opposite direction upon the next impulse from the controller. At the end of any impulse, if the change is just sufficient to make the paper the proper thickness, the gauging device will allow the gate to remain in this position until the thickness of the paper again varies.

To obviate any possibility of injury to the motor 14 or the parts associated therewith, an automatic stop mechanism is provided, comprising a pair of levers 50 and 51, which are pivoted at one of their ends and cooperate with a contact bar 52, the levers 50 and 51 being normally held in contact with the bar 52 by means of a spring 53. Mounted in the standards 11 is a rod 54, which is slidable lengthwise, upon which are adjustably mounted stops 55 and 56, which cooperate with a stud 57 mounted on the stock gate 9, said stud, when contacting with either of the stops 55 or 56, moving the rod 54 lengthwise in opposite directions. Also adjustably mounted on the rod 54 is a trip bar 58, which is normally positioned between the free ends of the levers 50 and 51, so that when the gate 9 moves a prescribed distance in either direction, the stud 57 will contact with either the stop 55 or 56 and move the trip bar 58 into engagement with either the lever 50 or 51 and move said levers so as to break the circuit to the motor 14 and stop operation of the motor, thereby obviating the possibility of the motor operating to such an extent as to cause injury to any of the parts by moving the gate 9 too far in either direction.

As shown and described, this device is adapted primarily for use with paper manufacturing machines, but it will be understood that it may be applied and used for many purposes where intermittent timed impulses are required or desired.

In operation, in the event the paper sheet becomes thinned beyond the required degree, the position of the disks 22 and 23 will cause the hand 19 to move into contact with one of the contacts 17 or 18, and as an illustration, we will designate contact 17, a circuit will be formed through the magnet 24 and the switch 26 closed, so that when the magnet 30 is energized and the switch 28 closed, the motor will be operated to move the gate 9 over the open end of the passage 8.

In the event the sheet being formed becomes thickened beyond the required regulation, the disks 22 and 23 will be separated and the hand 19 moved into engagement with the contact 18, thereby energizing the magnet 25 and closing the switch 27. This will result in causing the motor 14 to rotate in the opposite direction and move the gate 9 over the passage 7, when the switch 30 is closed, thus retarding the feed of the pulp to the machine and causing the surplus to return through the passage 8 to its initial starting point.

As the cam 32 is constantly rotating, when one or the other of the switches 26 or 27 is closed, an impulse will be imparted to the motor 14 when the cam raises the bar 31 a sufficient distance to permit the contacts 35 and 36 to come together, the length and duration of each impulse being determined by the vertical adjustment of the pin 44. Should it be desired to lengthen the duration of the impulses imparted to the motor, the nut 46 is operated to lower pin 44, or operated to elevate the pin in the event the length of impulse is to be shortened, the duration of the impulses being substantially accurately indicated by the position of the finger 49 on the scale 48. With each break between the contacts 35 and 36, the switch 28 will be opened and all current to the motor 14 cut off and owing to the construction of the cam 32, the break between these contacts will be practically instantaneous.

Should the thickness of the sheet of paper be not fully regulated prior to the gate 9 reaching its limit of travel in each direction, or should the circuit breaking mechanism fail to operate, the stud 57 will engage one or the other of the stops 55 or 56 and move the rod 54 endwise a sufficient distance to move one or the other of the levers 50 or 51 out of engagement with the bar 52, through contact of the trip bar 58 with said levers, thereby breaking the circuit to the motor and causing the motor to stop rotating.

Should the paper be running thin, the gate 9 will be automatically shifted laterally to admit more stock to the passage way 7 and in the opposite direction when the paper is running too thick, thus causing a larger portion of the stock to return to its initial storage point and lessening the amount of stock entering the passage way 7, the movement of the gate continuing intermittently until the paper has been restored to proper thickness, or until the operation of the motor has been automatically stopped.

What we claim is:

1. A controller adapted to impart impulses, means for controlling the duration of said impulses, and means for indicating the duration of said impulses.

2. The combination with a movable element, and a motor for operating said movable element, of means for imparting impulses to said motor of an exact duration, means for increasing or decreasing the duration of said impulses, and means for indicating the duration of said impulses.

3. A movable element, a reversible motor for operating said movable element, selective means for governing the direction of rotation of said motor, means for imparting electrical impulses to said motor for intermittently operating the same, and means for adjusting parts of said impulse creating means whereby impulses of different durations may be obtained.

4. A movable element, a motor for operating said movable element, means for imparting impulses to said motor comprising a pivoted bar, a rocker arm carried by said bar, means for intermittently elevating said bar, and adjustable means cooperating with said rocking arm for determining the duration of the impulses.

5. A controller adapted to impart impulses, a pivoted element, a rocking element carried thereby, cooperating contact points on said pivoted and rocking elements, means for operating said pivoted element for bringing said contacts together, means cooperating with said rocking element for controlling the duration of said impulses, and adjustable means for obtaining impulses of different durations.

6. The combination with a valve structure, and a motor for operating said valve, of an electric circuit, means for constantly imparting intermittent impulses through said circuit, means for cutting said impulses into or out of said motor, and adjustable means for controlling the duration of said impulses.

7. The combination with a movable gate and means for moving said gate in opposite directions, of means for rendering the gate moving means inoperative when the gate has reached a predetermined position in its movement in one direction but without disturbing the operative mechanism for propelling the gate in the opposite direction comprising a pair of spaced pivoted levers, a contact member associated with said levers, and a member operated by the movement of said gate for moving one or the other of said levers for breaking a circuit through said contact member at the opposite ends of the travel of the gate.

8. In a paper making machine, the combination with a gate for controlling the flow of material to said machine, an electric motor for moving said gate in either direction, and an electric circuit for controlling said motor, of a circuit breaking mechanism in said electric circuit including circuit breaking members arranged in pairs and a trip bar between said circuit breaking members operable by said gate adapted to engage one or the other of said circuit breaking members and break the circuit to said motor when the gate has been moved to a predetermined point in either direction without disturbing the contact of the other circuit breaking members.

9. The combination with a movable gate, a motor for moving said gate, and an electric circuit connected with said motor, of a pair of gap forming members in said circuit, means for operating one or the other of said gap forming members for determining the direction of rotation of said motor, a single gap forming member also in said circuit, and means for intermittently operating said single gap forming member whereby measured impulses will be imparted to said motor when one of the pair of gap forming members is closed.

10. The combination with an electric motor, and an electric circuit connected therewith, of a pair of gap forming members in said circuit, means for operating said gap forming members for determining the direction of rotation of said motor, a single gap forming member also in said circuit, and means for operating said single gap forming member for imparting series of impulses to said motor.

11. The combination with an electric motor, and an electric circuit connected therewith, of a pair of companion switches in said circuit, means for closing and opening said switches, said switches determining the direction of rotation of said motor, a single switch also in said electric circuit, means for opening and closing said single switch, and means for imparting interrupted impulses to said motor when one of the pair of switches and the single switch is closed.

12. In a paper making machine, a gate for controlling the flow of material to said machine, a motor for operating said gate, a calipering mechanism for measuring the thickness of the paper formed by said machine, an electric circuit connecting said motor and calipering device, means controlled by said calipering device for determining the direction of rotation of said motor, and electrically controlled means independent of said calipering device for imparting timed impulses to said motor.

13. In a paper making machine, a gate for controlling the flow of paper forming material to said machine, a motor for operating said gate, an electric circuit connected with said motor, a calipering device in said circuit for measuring the thickness of the paper formed by said machine, a pair of gap forming mechanisms in said circuit controlled by said calipering device for determining the direction of rotation of said motor, a single gap forming mechanism in said circuit, and means for intermittently operating said single gap forming mechanism for imparting successive impulses to said motor.

14. In a paper making machine, a thickness gauge having a contact member movable when the paper thickness varies, a movable element for regulating the amount of stock fed to said machine, a motor for operating said movable element, an electric circuit, reversing switches operated by the contact member, and a separate switch operated at regular intervals for causing said motor to operate in event one of the reversing switches is closed.

15. In a paper making machine, a thickness gauge having a contact member movable when the paper thickness varies, a movable element for regulating the amount of stock fed to said machine, a motor for operating said movable element, an electric circuit, reversing switches operated by the contact member, and a separate switch for causing said motor to operate in event one of the reversing switches is closed, and means for operating the separate switch at regular intervals.

16. In a paper making machine, a thickness gauge having a contact member movable when the paper thickness varies, a movable element for regulating the amount of stock fed to said machine, a motor for operating said movable element, an electric circuit, reversing switches operated by the contact member, a separate switch for causing said motor to operate in event one of the reversing switches is closed, and adjustable means for operating the separate switch at regular intervals.

17. In a paper making machine, a movable element for regulating the amount of stock fed to said machine, a motor for operating said movable element, contact members for operating said motor in one direction for increasing the amount of stock fed and in the opposite direction for decreasing the amount of stock fed, and a separate means operated at regular intervals for causing said motor to operate in event either of said contact members is closed.

18. In a paper making machine, a movable element for regulating the amount of stock fed to said machine, a motor for operating said movable element, an electric circuit, means for arranging said circuit to operate said motor in one direction to increase the amount of stock fed and in the opposite direction to decrease the amount of stock fed, separate means for connecting said circuit to said motor, means for operating said separate connecting means, and adjustable means for regulating the length of time said circuit is connected to the motor.

19. In a paper machine, the combination of means to feed paper stock to the machine and a controlling valve therefor, electrically controlled means operable to open and close said valve, a device movable on changing thicknesses of the paper, together with electrical connections from said device to said controlled means arranged for a movement of the device in one direction to cause the valve to open and a movement thereof in the other direction to cause the valve to close, and means for opening and closing the circuit in said electrically controlled means at regular predetermined intervals whereby the means operable to open and close the valve will operate for a predetermined duration, substantially as set forth.

In witness whereof, we have hereunto set our hands at Columbus, Indiana, this 1st day of April, 1929.

DARCY E. LEWELLEN.
EMMONS F. LEWELLEN.